United States Patent
Ibrahim et al.

(10) Patent No.: US 11,864,158 B2
(45) Date of Patent: Jan. 2, 2024

(54) DISTRIBUTED METHOD FOR ALLOCATING TRANSMISSION RESOURCES TO D2D TERMINALS IN A CELLULAR ACCESS NETWORK

(71) Applicant: ORANGE, Issy-les-Moulineaux (FR)

(72) Inventors: Rita Ibrahim, Chatillon (FR); Berna Sayrac, Chatillon (FR); Mohamad Assaad, Gif sur Yvette (FR)

(73) Assignee: ORANGE, Issy-les-Moulineaux (FR)

( * ) Notice: Subject to any disclaimer, the term of this patent is extended or adjusted under 35 U.S.C. 154(b) by 335 days.

(21) Appl. No.: 17/056,167

(22) PCT Filed: May 15, 2019

(86) PCT No.: PCT/FR2019/051099
§ 371 (c)(1),
(2) Date: Nov. 17, 2020

(87) PCT Pub. No.: WO2019/220054
PCT Pub. Date: Nov. 21, 2019

(65) Prior Publication Data
US 2021/0219266 A1    Jul. 15, 2021

(30) Foreign Application Priority Data

May 18, 2018   (FR) ...................................... 1854184

(51) Int. Cl.
*H04W 72/02*   (2009.01)
*H04W 4/70*    (2018.01)
(Continued)

(52) U.S. Cl.
CPC ............. *H04W 72/02* (2013.01); *H04W 4/70* (2018.02); *H04W 12/06* (2013.01); *H04W 72/23* (2023.01); *H04W 72/563* (2023.01)

(58) Field of Classification Search
CPC ...... H04W 4/70; H04W 72/563; H04W 12/06
See application file for complete search history.

(56) References Cited

U.S. PATENT DOCUMENTS

2020/0296692 A1* 9/2020 Lee .................... H04W 52/346

OTHER PUBLICATIONS

K. Doppler, M. Rinne, C. Wijting, C. Ribeiro, and K. Hugl, "Device-to-device Communication as an underlay to lte-advanced networks," IEEE Commun. Mag., vol. 47, No. 12, pp. 42-49, 2009.
IEEE "Design Aspects of Network Assisted Device-to-Device Communications" by Gábor Fodor, Erik Dahlman, Gunnar Mildh, Stefan Parkvall, Norbert Reider, György Miklós and Zoltan Turányi, published in Mar. 2012 in Communications Magazine.

(Continued)

*Primary Examiner* — Rhonda L Murphy
(74) *Attorney, Agent, or Firm* — David D. Brush; Westman, Champlin & Koehler, P.A.

(57) ABSTRACT

A method for allocating transmission resources to at least one terminal of a set of D2D terminals for direct communication implemented by a cellular access network having a base station. The method includes, for a transmission interval: calculating, by each transmitter terminal of a D2D pair, of a value of a utility metric indicating an energy efficiency of the D2D communication of the pair; determining a transmission resource index to be used for the relaying of an indicator by each transmitter terminal of a D2D pair by comparing its value of the utility metric with the table of correspondence; relaying an indicator, by each transmitter terminal of pair, via the index resource representing the value of its utility metric; and determining, by the base station an optimum D2D transmitter terminal, of which the resource for relaying the indicator has the minimum order index, for the allocation of resources.

19 Claims, 3 Drawing Sheets

(51) Int. Cl.
    *H04W 12/06*     (2021.01)
    *H04W 72/23*     (2023.01)
    *H04W 72/563*     (2023.01)

(56) References Cited

OTHER PUBLICATIONS

MJNL Georgiadis and L. Tassiulas, "Resource allocation and cross-layer control in wireless networks", 2006, chapter 4 sections 4.4 and 4.5, pp. 49-57.
3GPP TR 36.843 Study on LTE device to device proximity services; Radio aspects.
International Search Report dated Sep. 11, 2019 for corresponding International Application No. PCT/ FR2019/051099, filed May 15, 2019.
Written Opinion of the International Searching Authority dated Sep. 11, 2019 for corresponding International Application No. PCT/ FR2019/051099, filed May 15, 2019.
Wang Feiran et al. "Energy-Efficient Resource Allocation for Device-to-Device Underlay Communication", IEEE Transactions on Wireless Communications, IEEE Service Center, Piscataway, NJ, US, vol. 14, No. 4, Apr. 1, 2015 (Apr. 1, 2015), pp. 2082-2092, [retrieved on Apr. 7, 2015], DOI: 10.1109/TWC.2014.2379653, ISSN: 1536-1276, XP011577908.
Rita Ibrahim et al., "When Distributed outperforms Centralized Scheduling in D2D-Enabled Cellular Networks", arxiv.org, Cornell University Library, 201 Olin Library Cornell University Ithica, NY 14853, Jun. 6, 2018 (Jun. 6, 2018), XP080887650.

\* cited by examiner

DISTRIBUTED METHOD FOR ALLOCATING TRANSMISSION RESOURCES TO D2D TERMINALS IN A CELLULAR ACCESS NETWORK

CROSS-REFERENCE TO RELATED APPLICATIONS

This Application is a Section 371 National Stage Application of International Application No. PCT/FR2019/051099, filed May 15, 2019, which is incorporated by reference in its entirety and published as WO 2019/220054 A1 on Nov. 21, 2019, not in English.

FIELD OF THE INVENTION

The present invention pertains to the field of telecommunications. Within this field, the invention relates more particularly to access networks and to the allocation of resources for establishing D2D communications.

PRIOR ART

An access network to a telecommunications system comprises an access point which forms the interface between a terminal and the access network. In a cellular access network, sometimes referred to as a mobile network, the access point is commonly called a base station.

A mobile terminal that wants to establish a communication with a recipient must be identified by a base station and must request to be served by the base station. The base station can serve the terminal if it can allocate a spectral resource thereto.

Mobile access networks are faced with a growing demand for establishing communications which results in an increase in the load on base stations. When the base station has allocated all of its spectral resources, it has reached full load. It can no longer serve new terminals until one of its spectral resources is freed up.

The concept of direct communications (D2D for device-to-device) between two terminals within an access network has been introduced [1]. A pair of what are referred to as D2D terminals thus establishes a communication without going through the base station. This requires that the two terminals be close to one another with a maximum distance depending on the technology used for transmission.

These direct communications are not without impact on the communications established via the base station. Indeed, they generate interference, more particularly in the communications of terminals which share the same spectral resource.

These direct communications make it possible to increase the number of communications beyond the full load of the base station and therefore make it possible to improve the spectral efficiency of the access network.

The base station being aware of the state of the propagation channel makes it possible to adjust the allocation of resources and to improve the performance of the communications established by the access network. However, the base station cannot be aware of the state of all of the channels without overloading the signaling between the terminals and the base station.

The authors of [2] propose a resource and power allocation method based on an iterative combinatorial auction (ICA) algorithm with a view to optimizing the energy efficiency of communications. Such a method based on game theory is very complex in terms of the number of calculations and requires several iterations to reach a state of equilibrium of the resources allocated within the access network. In addition, this method requires coordination between the terminals which is obtained by means of additional special signaling.

DISCLOSURE OF THE INVENTION

The invention proposes a method for allocating resources implemented by a cellular access network comprising a base station which optimizes the performance of an access network with D2D terminals.

The subject of the invention is a method for allocating transmission resources to at least one transmitter terminal of a set of pairs of terminals of index n that are candidates for direct communication, referred to as D2D terminals. The channel between two D2D terminals in direct communication is referred to as the D2D channel. The method comprises the definition of a lookup table of correspondence between different intervals of values of a utility metric and a list of indices ordered from a minimum index to a maximum index defining a ranking of resources available for reporting an indicator of the state of a D2D channel. The method further comprises, for a current transmission interval:

calculation, by each transmitter terminal of a D2D pair of the set, of a value of the utility metric $v_n(t)$ assessing an energy efficiency of the D2D communication of the pair, determination of an index of a transmission resource to be used for the reporting of an indicator by each transmitter terminal of a D2D pair of the set by comparing its value of the utility metric $v_n(t)$ with the lookup table, reporting, by each transmitter terminal of a D2D pair of the set, of an indicator via the resource of determined index, and determination of what is referred to as the "optimum" D2D transmitter terminal whose resource for reporting the indicator has the minimum order index, this optimum terminal being the D2D terminal authorized to transmit during the current transmission interval.

The cellular access network comprises a base station and a plurality of pairs of D2D terminals. Access to the channel may be orthogonal according to an OFDMA, TDMA or CDMA technique. It may be non-orthogonal but in this case the network must manage interference due to this type of access. The base station SB is aware of the active terminals in its radio coverage zone (according to its transmitted power, the characteristics of the transmitted signal and the propagation conditions) given the exchanges in the signaling channel, sometimes known as the feedback path. These terminals are referred to as identified terminals. Generally, the base station identifies these terminals by retrieving an identifier provided by any terminal which seeks to access the access network. Depending on the type of the access network, the identifier corresponds for example to the MSISDBN, more commonly referred to as the telephone number. The base station is also aware of the recipients of the communications requested by the various terminals identified. The base station is therefore able to detect pairs of terminals located in its coverage zone which request the establishment of a communication and which are therefore capable of implementing a direct communication without going through the base station.

The distribution of the calculations over each D2D terminal makes it possible to benefit from the local knowledge of the state of the D2D channel by the transmitter of the D2D pair, and so the method is referred to as a decentralized method, unlike what is referred to as a centralized method in which the base station has statistics on all of the channels but does not know the state of all of these D2D channels at any given time without overloading the signaling.

Each transmitter of the D2D pairs shares, with a potential base station and with the other terminals of the D2D pairs, their local knowledge of the state of their D2D channel (as well as the value of their performance metric, also referred to as the utility metric) by reporting a simple indicator on a resource whose index is representative of this state and of the value of this performance metric.

Each transmitter therefore chooses the resource used for reporting the indicator according to the instantaneous state of its channel and the instantaneous value of its performance metric. The identification of the resource onto which the transmitter maps this reported indicator allows the potential base station and the other terminals to deduce therefrom a level of the value of the performance metric using a correspondence rule.

Thus, the feedback from the D2D terminals can be very restricted and be limited to one bit, which advantageously makes it possible to lighten the signaling load.

Since the utility metric aims to minimize the energy consumption of the D2D communications while observing a throughput constraint, determining the minimum index of resources used for the reports allows the optimum transmitter terminal to be identified easily by each of the D2D terminals and by the potential base station. Only this optimum terminal benefits from allocation of transmission resources for transmission during the transmission interval.

A further subject of the invention is a base station suitable for implementing a method for allocating transmission resources according to the invention. The base station comprises:
  a memory storing a lookup table of correspondence between different intervals of values of a utility metric and a list of indices ordered from a minimum index to a maximum index defining a ranking of resources available for reporting an indicator of the state of a D2D channel,
  a receiver for receiving indicators reported via transmission resources, the respective index of which is determined by the transmitter terminal of a D2D pair by comparison between its value of the utility metric $v_n(t)$ and the lookup table,
  a processor for determining what is referred to as an "optimum" D2D transmitter terminal whose resource for reporting the indicator has the minimum order index,
  a transmitter for authorizing, via a control channel, the optimum terminal to transmit during the transmission interval.

A further subject of the invention is an access network comprising at least one base station according to a subject of the invention.

A further subject of the invention is a D2D terminal suitable for implementing a method for allocating transmission resources according to the invention. The terminal comprises:
  a memory storing a lookup table of correspondence between different intervals of values of a utility metric and a list of indices ordered from a minimum index to a maximum index defining a ranking of resources available for reporting an indicator of the state of a D2D channel,
  a processing unit for calculating a value of the utility metric $v_n(t)$ assessing an energy efficiency of the D2D communication of the pair and for determining an index of a transmission resource to be used for reporting an indicator by comparing its value of the utility metric $v_n(t)$ with the lookup table,
  a transmitter for reporting, to the base station, an indicator via the resource of determined index,
  a receiver for receiving the indicators reported from other D2D terminals and/or for receiving authorization to transmit from the base station.

According to one embodiment, the terminal is such that the processing unit updates the lookup table in the event of a collision during the reporting of the indicators.

According to one embodiment of the invention, the utility metric $v_n(t)$ is a function of the transmitted power and of the instantaneous throughput of communication of the D2D transmitter.

According to this embodiment, the utility metric assesses the energy efficiency of a D2D communication by assessing the level of power transmitted by this terminal under the constraint of a throughput determined by the instantaneous state of the D2D channel.

According to one embodiment of the invention, the method further comprises the broadcasting of at least one parameter which minimizes the probability of collision between the reports of indicators on the resources used.

According to one embodiment of the invention, the method further comprises modification of the lookup table following a collision between reports of an indicator by a plurality of D2D transmitter terminals using the same resource index.

The lookup table includes thresholds defining ranges of variation of the utility metric and comprises an index of resources corresponding to each range of variation. When a collision occurs due to the reporting by at least two D2D transmitter terminals of an indicator using the same resource index then the modification consists in dividing into a plurality of ranges the range corresponding to the index where the collision took place. The increase in the granularity of the ranges advantageously makes it possible to decrease the probability of collision.

According to one embodiment of the invention, the access network is of LTE type and the reported indicator is quantized on a maximum of two bits of a PUCCH format 1b control channel.

According to one embodiment of the invention, the access network is of LTE type and the allocation of transmission resources from the base station to the optimum terminal uses a PDCCH downlink control channel of the access network.

The invention also applies to a computer program, in particular a computer program on or in an information medium, suitable for implementing the invention. This program may use any programming language, and be in the form of source code, object code, or intermediate code between source code and object code such as in a partially compiled form, or in any other form desirable for implementing a method for allocating transmission resources according to the invention. This program may have a plurality of modules intended for different entities such as the base station and the D2D terminals.

The information medium may be any entity or device capable of storing the program. For example, the medium may include a storage means, such as a ROM, for example a CD-ROM or a microelectronic circuit ROM, or else a magnetic recording means, for example a floppy disk or a hard disk.

As an alternative, the information medium may be an integrated circuit in which the program is incorporated, the circuit being designed to execute or to be used in the execution of the method in question.

Moreover, the program may be translated into a transmissible form such as an electrical or optical signal, which may be conveyed via an electrical or optical cable, by radio or by other means. The program according to the invention may in particular be downloaded from an Internet network.

LIST OF THE FIGURES

Other features and advantages of the invention will become apparent from the following description of examples given by way of non-limiting examples, which description is given with reference to the following appended figures.

DESCRIPTION OF EMBODIMENTS OF THE INVENTION

Figure 1:
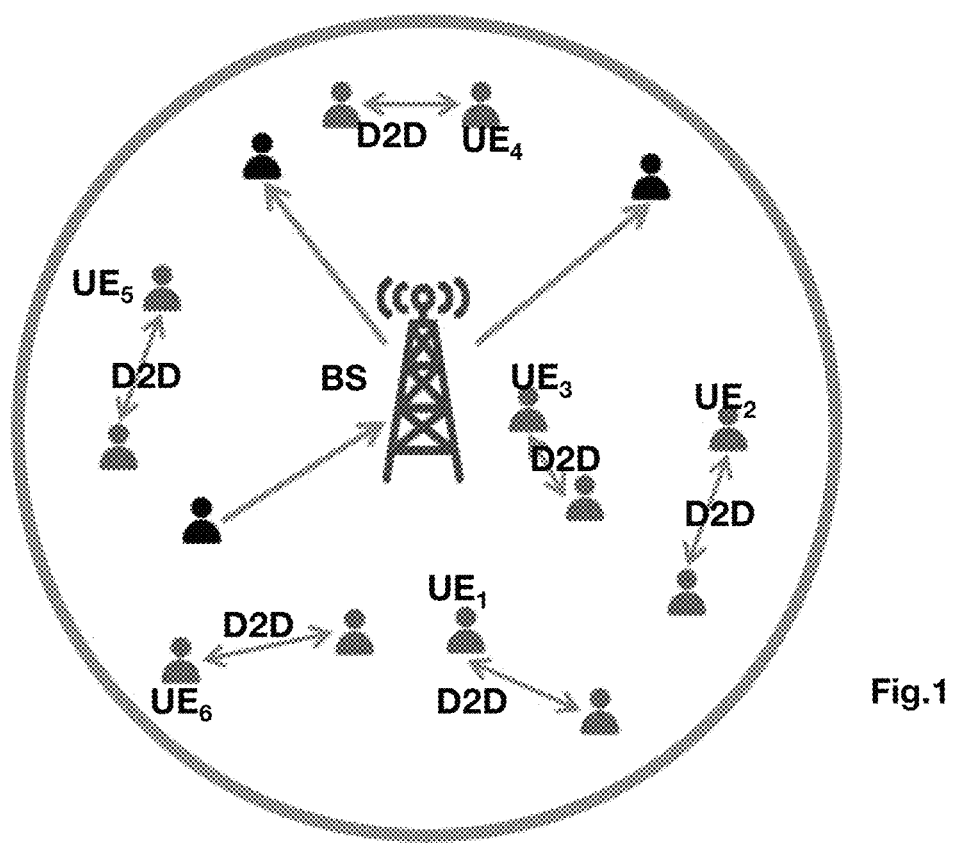
FIG. 1 is a diagram of an access network with a base station and D2D terminals identified by this station.

An access network is illustrated in FIG. 1. A single base station BS is shown for simplicity, but the access network may comprise other base stations.

The coverage zone is represented highly schematically by a circle centered on the base station. Of course, this zone actually has a contour that depends on the environment, this environment in particular influences the propagation conditions and therefore the range in a given direction. The terminals identified by the base station are shown distributed more or less regularly around the base station. It is understood that this representation is used for illustrative purposes and that in reality the distribution is completely random.

A terminal which is allocated a spectral resource by the base station for establishing a communication relayed by this station is referred to as a "served" terminal. However, when the station has allocated all of its spectral resources, it is fully loaded and can no longer serve any terminals which request the establishment of a communication.

During the request for establishment of the communication, the base station is aware of the identifier of the recipient. By comparing with a list of terminals identified in its coverage zone, the base station can determine whether the recipient belongs to this list. Thus, the base station can identify pairs of D2D terminals capable of establishing direct communication. The terminals of an $n^{th}$ D2D pair are separated by a distance $d_n \in [d_{min}, \ldots, d_{max}]$.

The access network thus comprises a set $\Omega$ of $N \geq 2$ pairs of D2D terminals, N=6 according to the illustration. For the sake of simplicity, if resources are allocated to D2D terminals then they are different from the resources allocated to cellular terminals (i.e. whose communication is relayed by the base station). Thus, interference caused by D2D terminals in cellular terminals is by design minimized and vice versa.

The links between the various nodes of the system are subject to fading (Rayleigh fading) and to white Gaussian noise. Channel gains are assumed to be constant during a transmission interval (time slot). They change independently from one transmission interval to another following a complex Gaussian distribution with an average of zero and unitary variance.

A mechanism between the D2D pairs allows the transmitter terminals $UE_1, \ldots, UE_6$ of the pairs to know a CSI (channel state information) state of the corresponding D2D channel. For example [3] is cited which describes the use of reference signals for the determination of the channel gain between the transmitter and the receiver of the $n^{th}$ D2D pair in a manner comparable to the use made in LTE of the DMRS demodulation reference signals which are integrated into the transmission signal. It is therefore considered that the transmitter terminal $UE_n$ of a D2D pair can estimate an instantaneous state (for example the channel gain $h_n$) of the D2D channel at each transmission interval. According to the state $h_n$ of the channel, this terminal $UE_n$ can deduce therefrom the power $P_n(t)$ and the throughput $R_n(t)$ that minimize a determined utility metric $v_n(P_n(t), R_n(t))$ known to the D2D terminals The bit rate bit/s R associated with a link is assumed to correspond directly with the radio performance of this link, i.e. the signal to noise ratio SNR on reception (the correspondence may result from the calculation bit rate=log(1+SNR) or result from a mapping performed after completing the link simulations).

The access network is configured with a set of M SNR thresholds, $\{\gamma_1, \ldots, \gamma_M\}$ which are used to quantize the SNR on reception of each of the D2D links: if a D2D link has an SNR between two thresholds of the set then its SNR is chosen so as to be equal to the lower threshold, $\gamma_i \leq SNR < \gamma_{i+1} \Rightarrow SNR = \gamma_i$. Thus, the system distinguishes M throughputs $\{R_1, \ldots, R_M\}$ which correspond directly with the M SNR thresholds $\{\gamma_1, \ldots, \gamma_M\}$ i.e. if the D2D link has an SNR $\gamma_i$ then it allows a throughput $R_i$ to be reached.

An LTE network identifies fifteen values for the quality of a channel coded with a four-bit index to which fifteen throughput values correspond: $\{R_1, \ldots, R_M\}=\{R_1, \ldots, R_{15}\}$. Therefore $R_n(t) \in \{R_1, \ldots, R_{15}\}$.

To reach the throughput $R_i$, the transmit power of the transmitter of the D2D link $n \in N$ is determined by:

$$P_{n,i} = \min\left\{\frac{\gamma_i N_o}{|h_n|^2 L_n}, P_{max}\right\} \tag{1}$$

with $\gamma_i$ the SNR of the D2D link $n \in N$, $h_n$ the fading coefficient of the D2D link n also referred to as gain of the channel, $L_n$ the attenuation of the link (path loss) which essentially depends on the distance $d_n$ between the terminals of the D2D pair n, $N_o$ the power of the noise on reception and $P_{max}$ the maximum power available at the transmitter terminal of the D2D pair n.

Access to the channel is assumed to be of TDMA type such that a single D2D communication benefits from resources at each transmission interval. In other words, at most a single terminal D2D is allocated one or more resources at each transmission interval.

For a given transmission interval (time slot) t, the following notations are used:

$H(t)=[h_1, h_2, \ldots, h_N]$ the channel state vector (channel gains) of the N D2D pairs, $R_n(t)$ the throughput of the $n^{th}$ D2D communication, $P_n(t)$ the transmit power for this $n^{th}$ D2D communication, $R_{th}$ the time average throughput threshold which corresponds to the SNR threshold $\gamma_{th}$, P(t) the matrix of dimensions N×M of the powers of the N pairs of D2D terminals in order to obtain the M throughputs $\{R_1, \ldots, R_M\}$:

$$P(t) = \begin{bmatrix} P_{1,1} & P_{1,2} & \ldots & P_{1,M} \\ P_{2,1} & P_{2,2} & \ldots & P_{2,M} \\ \ldots & \ldots & \ldots & \ldots \\ P_{N,1} & P_{N,2} & \ldots & P_{N,M} \end{bmatrix}$$

(the variable t has been removed from the matrix so as not to overload it)

The method according to the invention provides a solution to an optimization problem. This problem consists, at each transmission interval, in proposing a selection (strategy) Γ which identifies which information to report on the state of the channels and which jointly identifies the terminal to which a resource is allocated while observing a limitation on the resources available for the feedback of information with a view to minimizing the energy consumption of the D2D communications under the constraint of an average throughput. This problem may be written in the form:

$$\min_{\Gamma} \lim_{T \to \infty} \sup \frac{1}{T} \sum_{t=1}^{T} \sum_{n=1}^{N} \mathbb{E}[P_n(t)] \qquad (2)$$

under the constraint that $$\lim_{T \to \infty} \inf \frac{1}{T} \sum_{t=1}^{T} \mathbb{E}[R_n(t)] \geq R_{th}, \forall n.$$

The use of a Lyapunov technique [4] allows the optimization problem (2) to be written differently by introducing virtual queues $Q_n$, $Q_n(t+1)=\max((Q_n(t)-R_n(t)), 0)+R_{th}$.

Q is the vector of virtual queues for all of the transmitter terminals $UE_n$ of the pairs of D2D terminals: $Q=[Q_1, Q_2, \ldots, Q_N]$.

The optimization problem (2) then amounts to minimizing the energy consumption of the access network while guaranteeing the stability of the virtual queues and to do so even though the resources available for the feedback of information are limited.

The stability of the queues is obtained by minimizing the following expression:

$$\min_{\Gamma} \sum_{n=1}^{N} V\mathbb{E}[P_n(\Gamma(t))] - Q_n(t)\mathbb{E}[R_n(\Gamma(t))] \qquad (3)$$

with V a positive real number (weight) referred to as the Lyapunov constant chosen so as to allow the trade-off between minimizing the power and the size of the queues.

The utility metrics $v_n(t)$ may be expressed in the form:

$$v_n(t) = \min_{m \in \{1, \ldots, M\}} (VP_{n,m}(t) - Q_n(t)R_m(t)) \qquad (8)$$

At each transmission interval t, the utility metrics take values in the interval $[v_{min}(t), v_{max}(t)]$ such as:

$$v_{min}(t) = -tR_{th}R_M \qquad (9)$$

$$v_{max}(t) = v_{min}(t) + r\frac{VP_{max} - R_{th}R_1 - v_{min}(t)}{(K^{(2)})^f} \qquad (10)$$

with r=1, f=0 and $K^{(2)}$ the number of resource elements available for the D2D channel state indicator feedback (CSI feedback).

Figure 2:
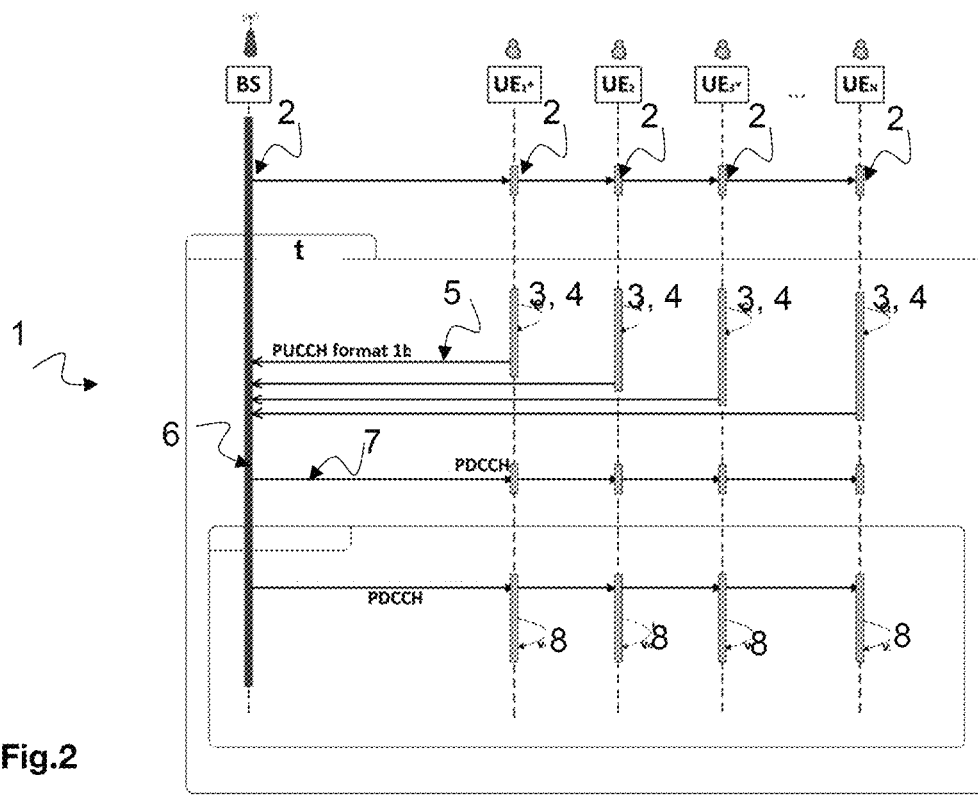
FIG. 2 is a flowchart of one embodiment of a method according to the invention.

One embodiment of a method for allocating transmission resources according to the invention is detailed below and illustrated by the flowchart shown in FIG. 2. The flowchart illustrated corresponds to an implementation in a compatible access network of an LTE standard from the 3GPP.

In a step 2, the method comprises the definition of the lookup table. This table establishes the correspondence between different intervals of values of the utility metric and a list of indices ordered from a minimum index to a maximum index. This list defines a ranking of the resources (called resource elements) available for the feedback of the indicator, for example of 1 or 2 bits, of the state of the D2D channel. The table may be defined by the base station and transmitted to the D2D terminals. It may equally be defined initially and stored by the station and the D2D terminals during an operation of initializing these devices.

The interval $[v_{min}(t), v_{max}(t)]$ is used to quantize the utility metric $v_n(t)$ and determine the lookup table. The table establishes a mapping between different sub-intervals of values of the utility metric $v_n(t)$ and a list of indices. The indices of the list are ordered from a minimum index to a maximum index in order to define a ranking of the resources available for the feedback of an indicator of the state of a D2D channel.

The continuous values of the interval $[v_{min}(t), v_{max}(t)]$ are quantized and mapped onto a finite set $\mathbb{S}_v = \{a_1, \ldots, a_{K^{(2)}}\}$ of $K^{(2)}$ elements such that:

$$a_j = v_{min} + (j-1)\frac{v_{max} - v_{min}}{K^{(2)} - 1} \text{ for } 1 \leq j \leq K^{(2)}.$$

Written differently:

$$\mathbb{S}_v = \bigcup_{j=1,\ldots,K^{(2)}} \left\{ v_{min} + (j-1)\frac{v_{max} - v_{min}}{K^{(2)} - 1} \right\} \qquad (11)$$

For each current transmission interval t, the method comprises the steps of calculating 3, of determining 4 an index, of reporting 5 the indicator, of determining 6 the optimum terminal and of authorizing 7 transmission.

Each transmitter terminal $UE_n$ of a D2D pair calculates 3 the value of the utility metric $v_n(t)$ given by relationship (8). 20 Each transmitter terminal $UE_n$ of a D2D pair determines 4 the index $\tilde{k}_n$ of the transmission resource to be used for reporting the indicator. This determination is performed by comparing the value of its utility metric with the lookup table.

The mapping, called channel indexing feedback, defined by the table matches the quantized value of the utility metric $v_n$ taken at a transmission interval t with an index $a_j$ of transmission resources for effecting the feedback of the indicator. At each transmission interval t, the quantized value is denoted by $\tilde{v}_n$ and the corresponding index of the transmission resource to be used for the reporting is denoted by $\tilde{k}_n$:

$$\tilde{v}_n = \operatorname*{argmin}_{a_i \in \mathbb{S}_v}(v_n(t) - a_i) 1_{\{v_n(t) > a_i\}} \quad (12)$$

$$\tilde{k}_n = \operatorname*{argmin}_{a_i \in \mathbb{S}_v}(v_n(t) - a_i) 1_{\{v_n(t) > a_i\}} \quad (13)$$

Figure 3:
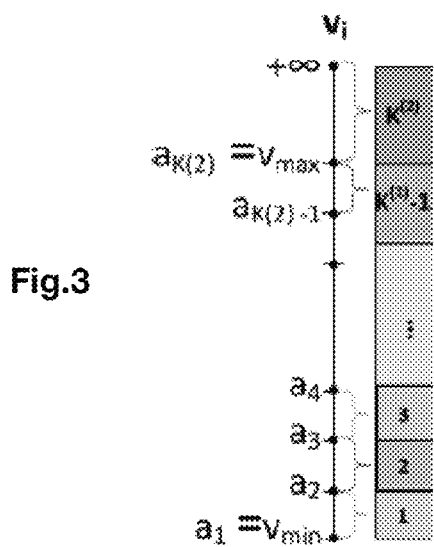
FIG. 3 is a diagram illustrating one embodiment of the mapping of the quantized values of the utility metric $v_n(t)$ onto the indices of the resources available for reporting information on the D2D channel.

The embodiment of the channel indexing mapping illustrated by FIG. 3 consists in determining to which sub-interval of the interval $[v_{min}(t), v_{max}(t)]$ the value of the utility metric $v_n$ taken at the transmission interval t belongs and for example retaining the low value of the sub-interval. The simplest mapping illustrated by FIG. 3 associates with the low values of the sub-intervals taken successively in ascending order the elements of $\mathbb{S}_v$ taken successively in ascending order from $a_1$ to $a_{K^{(2)}}$.

Figure 4:
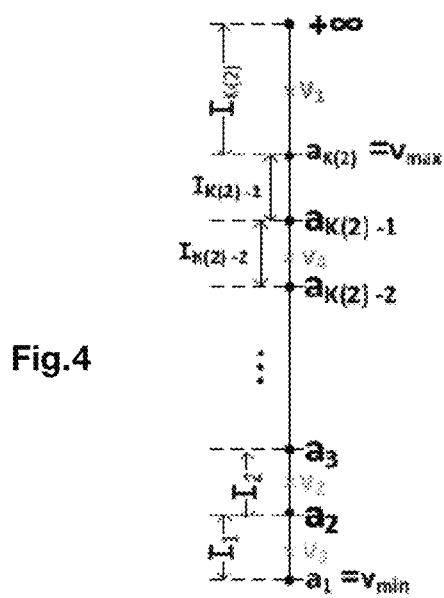
FIG. 4 is a diagram illustrating the indices of the resources for feedback on the state of the D2D channels of respectively four D2D terminals after mapping, referred to as feedback with channel indexing.

FIG. 4 illustrates the determination of the index $\tilde{k}_n$ of the transmission resource for four terminals of indices respectively n=1, n=2, n=3 and n=4. According to the example illustrated, $\tilde{v}_1 = a_{K^{(2)}}$ and $\tilde{k}_1 = K^{(2)}$, $\tilde{v}_2 = a_2$ and $\tilde{k}_2 = 2$, $\tilde{v}_3 = a_1$ and $\tilde{k}_3 = 1$, $\tilde{v}_4 = a_{K^{(2)}}{}_{31\ 2}$ and $\tilde{k}_1 = K^{(2)} - 2$. Ordered from the lowest to the highest value of the utility metrics of the four terminals, this gives:
  $\tilde{v}_3 = a_1$ and $\tilde{k}_3 = 1$
  $\tilde{v}_2 = a_2$ and $\tilde{k}_2 = 2$
  $\tilde{v}_4 = a_{K^{(2)} - 2}$ and $\tilde{k}_1 = K^{(2)} - 2$
  $\tilde{v}_1 = a_{K^{(2)}}$ and $\tilde{k}_1 = K^{(2)}$ Each transmitter terminal $UE_n$ of a D2D pair reports 5 the indicator using the resource whose index it determined in step 4. The value of this indicator may be identical between all of the terminals which report an indicator.

This reporting can be performed in an LTE network by means of a PUCCH (physical uplink control channel) format 1, 1a or 1b control signal. PUCCH format 1, 1a or 1b control signals are commonly used to signify an ACK/NACK acknowledgement or negative acknowledgement or to signify an authorization request (SR, scheduling request). The information carried by these control signals comprises one to two bits per sub-frame. The number $K^{(2)}$ of PUCCH format 1, 1a or 1b control signals that can be supported simultaneously is equal to the product of the two identifiers:
  $N_{RB}$ the number of resource blocks (RBs) available for a PUCCH format 2, 2a or 2b control channel at each time interval TTI (time slot) for the reporting of the CSI,
  $C_{MUX}^2$ which gives the multiplexing capacity per RB, that is to say the number of users who can report their CSI over the same PRB with a PUCCH format 1, 1a or 1b. This parameter depends on: (i) the number of possible orthogonal codes $N_{OC}$ and (ii) the difference $\Delta_{shift}^{PUCCH}$ between two consecutive cyclic shifts for resources using the same code. Thus, $C_{MUX}^2 = 12 N_{OC} / \Delta_{shift}^{PUCCH}$.
Therefore $K^{(2)} = N_{RB} \times C_{MUX}^2$.

The base station determines 6 the optimum transmitter terminal of index n* according to equation (14). This determination is very easy since it suffices to identify the resource used with the lowest index k*. This resource indeed corresponds to the smallest value of the utility metric between the different values determined by the different terminals, i.e. the terminal having the best energy efficiency.

$$n^* = \operatorname*{argmin}_{n \in \{1, \ldots, N\}} \{\tilde{v}_n | \tilde{v}_m \neq \tilde{v}_n \ \forall m \in \{1, \ldots, N\} \setminus n\} \quad (14)$$

The base station authorizes 7 (schedules) this optimum terminal to transmit during the current transmission interval t.

According to another embodiment of the method, each D2D terminal performs the functions of the base station described above. These terminals are assumed to be full-duplex type, they can receive and transmit at the same time. More precisely, the indicators are not reported only to a base station. According to this embodiment, each D2D terminal receives the indicator reports 5 performed by the other D2D terminals. Knowing its own resource index $\tilde{k}_n$, each terminal can determine the ranking of the resource indices used and identify the terminal n* that has used the resource with the lowest index k*. The terminal that has used the resource with the lowest index is therefore known to each of the D2D terminals and in particular to itself. It can therefore authorize itself to transmit during the current transmission interval t. Such an embodiment is particularly suitable for autonomous networks, i.e. those without a central entity.

Regardless of the embodiment of the method, collisions can occur during the reporting of the indices. A collision occurs when at least two terminals have the same quantized utility metric value $\tilde{v}_n$ and therefore use the same resource index $\tilde{k}_n$ to report their indicator. Such a collision does not allow the optimum terminal to be determined if it occurs for the lowest index used k*. Another optimum terminal can be determined if not all of the index reports experience a collision. In this case, the determined optimum terminal may be that corresponding to the lowest index that has not experienced a collision.

To limit collisions, certain adjustments to the method can be implemented. These adjustments consist in:
  a) choosing the weighting constant V for the transmitted power which minimizes a probability of collision between the report resources used,
  b) modifying 8 the lookup table after a collision or after each collision to avoid future collisions.

The adjustment according to b) may consist in updating the set of elements of $\mathbb{S}_v$. Considering that c is the lowest index of the resource on which a collision occurs, $1 \leq c \leq K^{(2)}$ then updating $\mathbb{S}_v$ consists in modifying the parameters r and f of equation (10) as follows:
  r is identified with the index c, r=c
  f is modified according to equations (15)

If $(r < K^{(2)})$ then $f = f + 1$ (15)

Else $(r == K^{(2)})$ then $f = 0$ (15)

The updating consists in decreasing the interval $[v_{min}(t), v_{max}(t)]$ which amounts to increasing the granularity of the sub-intervals and therefore decreasing the probability of collision.

When the collision does not take place on the resource with the highest order index, this updating additionally consists in dividing into a plurality of sub-intervals the sub-interval corresponding to the lowest index for which a collision took place while decreasing the interval $[v_{min}(t), v_{max}(t)]$. This makes it possible to increase the granularity in the collision region corresponding to the lowest index and advantageously makes it possible to decrease the probability of collision in this region.

In a context of absence of collision and considering that the method satisfies equation (16) according to the demonstration given in Annex A, then for a large finite value of V, the decentralized method 1 results in a distance that is at most equal to o(1/V) of the optimum solution denoted by $P^*_{id}$ to the optimization problem translated by equations (2) while guaranteeing the stability of the system of virtual queues with an average backlog of queues of o(V). The demonstration thereof is given in Annex A.

A collision occurs during the reporting of indicators when two terminals use the same resource element (RE). The probability of collision $P_c$ is defined as being the probability that each D2D terminal has at least one collision with another D2D terminal such that no D2D terminal can be authorized (scheduled) to transmit according to the method (i.e. none of the terminals has been able to report its indicator without being affected by a collision (i.e. no terminal has been able to have exclusive use of an available resource RE to report its indicator)).

As shown in Annex A, this probability can be expressed in the form:

$$P_c = 1 - \sum_{i=1}^{N} \sum_{j=1}^{K^{(2)}} \overline{p}_c\{i,j\} \prod_{k<j}^{K^{(2)}} \left(1 - \sum_{l=1 \neq i}^{N} \overline{p}_c\{l,k\}\right) \quad (17)$$

with:

$$\overline{p}_c\{i,j\} = 2[\exp(c_{i,j-1}) - \exp(c_{i,j})] \times \prod_{k=1 \neq i}^{N} [1 - 2\exp(c_{k,j-1}) + 2\exp(c_{k,j})]$$

$$c_{i,j} = -\frac{V_\gamma N_0}{(a_j + Q_i R)L_i}$$

As shown in Annex A, the probability of collision $P_c$ is bounded by a value $\varepsilon$, $0 \leq \varepsilon \leq 1$ when the value of the Lyapunov constant is given by:

$$V(\epsilon) = -\frac{R_{th} R \ln(\epsilon') T}{P_{max} \ln(\epsilon') + \gamma N_0 L_{min}^{-1}} \quad (18)$$

where $$\epsilon' := \frac{1}{2N}\left[1 - \left(\frac{1-\epsilon}{NK^{(2)}}\right)^{\frac{1}{N+K^{(2)}}}\right]$$

and $L_{min}$ is the attenuation (path loss) for a D2D link with $d_{min}$ the distance between the terminals of the D2D pair.

The appropriate choice of the value of the Lyapunov constant therefore makes it possible to keep the probability of collision below a low value $\varepsilon$, with $\varepsilon \rightarrow 0$.

Simulations were carried out in the context of an LTE system with the parameters given in table 1 in Annex A supplemented with the following parameters: $\gamma$=73 dB and R=700 kbps/RB.

Since the LTE considers fifteen different values for a CQI, the simulations considered fifteen bit rates, i.e. M=15. The values of these bit rates $\{R_1, \ldots, R_{15}\}$ correspond to the SNR set $\{\gamma_1, \ldots, \gamma_{15}\}$={0, 1, . . . , 14}dB. The N pairs of D2D terminals are assumed to be evenly distributed in the cell of radius $R_d$. Access to the network of the communications of these terminals depends on the method for allocating resources.

Figure 5:
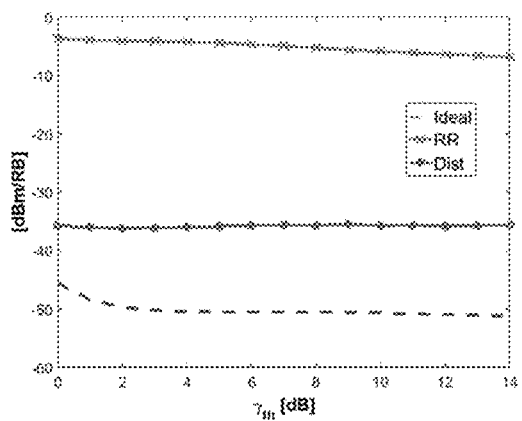
FIG. 5 shows curves resulting from simulations of the power consumed in dB/RB as a function of the SNR threshold $\gamma_{th}$ in dB for different methods for allocating resources.

FIG. 5 gives transmit power curves in dB/RB as a function of the SNR threshold $\gamma_{th}$ in dB. The curves correspond to a distributed method for allocating resources according to the invention (line with squares), to an ideal method for allocating resources (dashed line) and to a round robin method for allocating resources (line with crosses).

The ideal method for allocating resources is based on the base station knowing the state of all of the D2D channels. According to the round robin method for allocating resources, each subset $\Lambda$ of all $\Omega$ of the D2D terminals is allocated resources in an identical and circular manner over time.

Comparing the curves makes it possible to see that the distributed method according to the invention decreases the transmitted power spent on average by 100% compared to the round robin method for different values of SNR thresholds, $0 \leq \gamma_{th} \leq 14$ dB. The distributed method does not do as well as the ideal solution since collisions can occur. The simulations were able to show that the probability of collisions did not exceed 0.1, which made it possible to achieve the 100% performance with respect to the round robin method.

Figure 6:
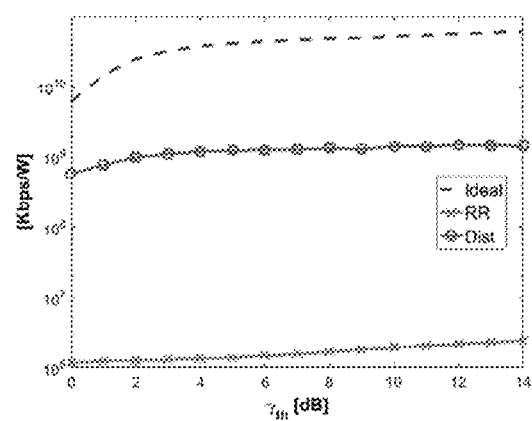
FIG. 6 shows curves resulting from simulations of energy efficiency for different methods for allocating resources.

FIG. 6 gives energy efficiency curves for the same methods for allocating resources as those considered for FIG. 5. The energy efficiency is assessed as being the ratio of the total throughput to the total power transmitted for the duration of all of the simulations. Thus, FIG. 6 shows the variation in energy efficiency in Kbps/W (ratio of the total throughput in kbits/s to the power transmitted in W) of the different methods as a function of the SNR threshold $\gamma_{th}$ in dB. Comparing the curves highlights that the distributed method according to the invention greatly improves energy efficiency compared to the round robin method for different SNR threshold values, $0 \leq \gamma_{th} \leq 14$ dB.

Figure 7:
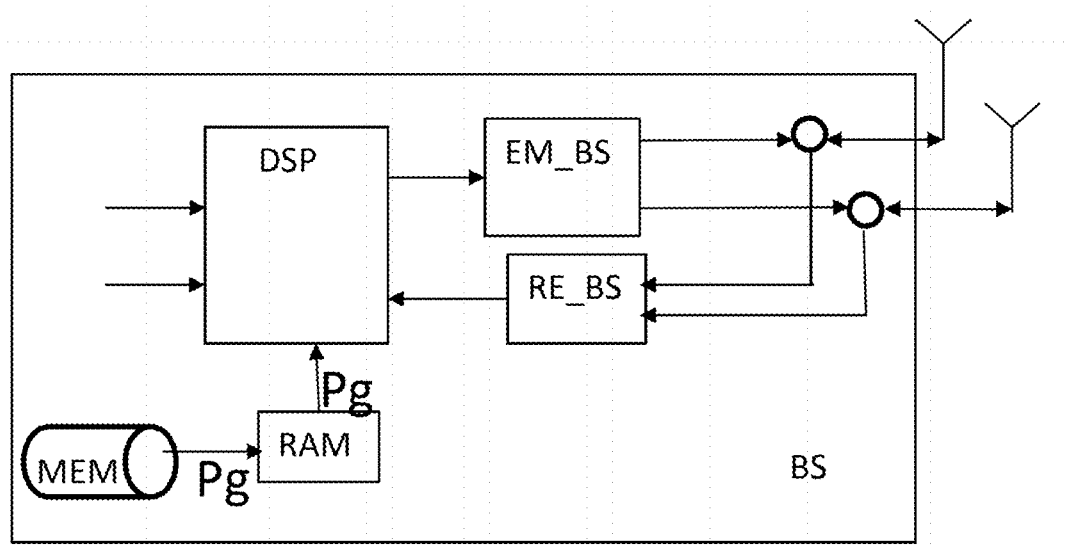
FIG. 7 is a diagram of a simplified structure of a base station implementing a method for allocating transmission resources according to the invention.

The simplified structure of a base station according to the invention implementing a method for allocating resources described above is described below and illustrated by FIG. 7.

Such a base station BS comprises a transmitter EM_BS, a receiver RE_BS, a memory MEM comprising a RAM buffer memory, a processing unit DSP, equipped for example with a microprocessor and controlled by the computer program Pg or possibly a specific module of the computer program Pg implementing the method for allocating resources according to the invention.

On initialization, the code instructions of the computer program Pg are for example loaded into the RAM memory, before being executed by the processor of the processing unit DSP.

The memory MEM stores the lookup table of correspondence between different intervals of values of a utility metric and a list of indices ordered from a minimum index to a maximum index defining a ranking of the resources available for reporting an indicator of the state of a D2D channel.

The microprocessor of the processing unit DSP implements the method for allocating resources described above, according to the instructions of the computer program Pg. For this, the receiver RE_BS receives indicators reported via transmission resources whose respective index is determined by the transmitter terminal of a D2D pair by comparing the value of its utility metric $v_n(t)$ and the lookup table. The processing unit DSP controlled by the microprocessor determines what is referred to as an "optimum" D2D transmitter terminal n* whose resource for reporting the indicator has the minimum order index. The transmitter EM_BS authorizes, via a control channel, the optimum terminal to transmit during the transmission interval.

Figure 8:
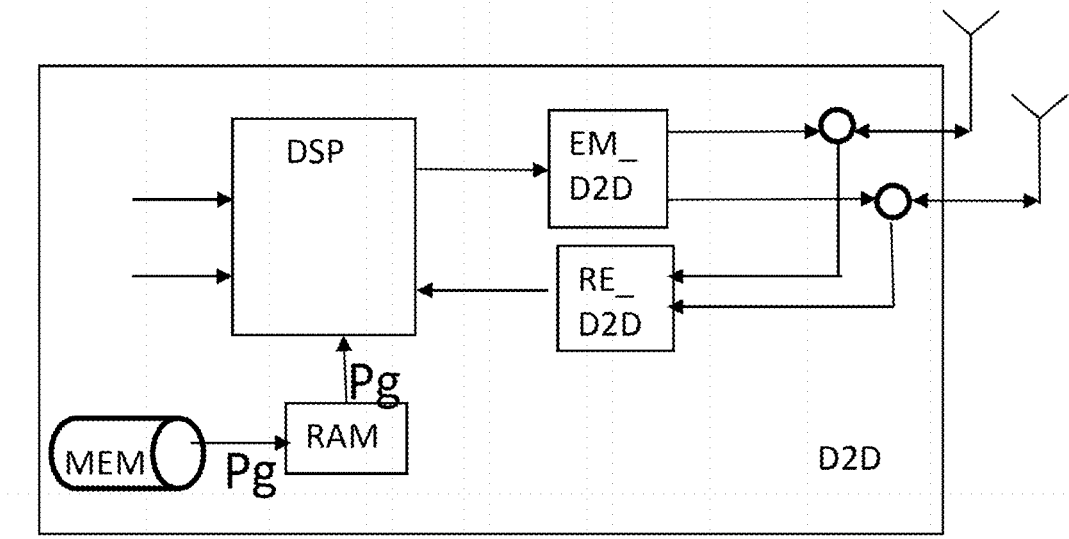
FIG. 8 is a diagram of a simplified structure of a D2D terminal implementing a method for allocating transmission resources according to the invention.

The simplified structure of a D2D terminal according to the invention implementing a method for allocating resources described above is detailed below and illustrated in FIG. 8.

Such a D2D terminal comprises an EM_D2D transmitter, a RE_D2D receiver, a MEM memory comprising a RAM buffer memory, a DSP processing unit, equipped for example with a microprocessor and controlled by the computer program Pg or possibly a module of the computer program Pg implementing the method for allocating resources according to the invention.

The memory MEM stores the lookup table of correspondence between different intervals of values of a utility metric and a list of indices ordered from a minimum index to a maximum index defining a ranking of the resources available for reporting an indicator of the state of a D2D channel.

On initialization, the code instructions of the computer program Pg are for example loaded into the RAM memory, before being executed by the processor of the processing unit DSP. The microprocessor of the processing unit DSP implements the method for allocating resources described above, according to the code instructions of the computer program Pg.

Thus the processing unit DSP calculates a value of the utility metric $v_n(t)$ assessing an energy efficiency of the D2D communication of the pair and determines an index of a transmission resource to be used for reporting an indicator by comparing its value of the utility metric $v_n(t)$ with the lookup table. The transmitter EM_D2D reports an indicator via the resource of determined index. The receiver RE_D2D receives the indicators from the other terminals. Either this receiver further receives an authorization to transmit from the base station, or this authorization to transmit is determined autonomously by the processing unit DSP of the terminal by comparing all of the indices received with its own report resource index.

REFERENCES

[1] K. Doppler, M. Rinne, C. Wijting, C. Ribeiro, and K. Hugl, "Device-to-device communication as an underlay to lte-advanced networks," *IEEE Commun. Mag.*, vol. 47, no. 12, pp. 42-49, 2009.
[2] F. Wang, C. Xu, L. Song, and Z. Han, "Energy-efficient resource allocation for device-to-device underlay communication," IEEE Transactions on Wireless Communications, vol. 14, no. 4, pp. 2082-2092, April 2015.
[3] IEEE "Design Aspects of Network Assisted Device-to-Device Communications" by Gabor Fodor, Erik Dahlman, Gunnar Mildh, Stefan Parkvall, Norbert Reider, Gyorgy Miklos and Zoltan Turányi, published in March 2012 in Communications Magazine
[4] MJNL Georgiadis and L. Tassiulas, Resource allocation and cross-layer control in wireless networks, 2006, chapter 4 sections 4.4 and 4.5, pages 49-57.
[5] 3GPP TR 36.843 Study on LTE device to device proximity services; Radio aspects Annex A The method according to the invention satisfies the following proposition 3.

Proposition 3

Let $P^*_{id}$ be the average power (in time) obtained with an ideal authorization (scheduling) according to which the network has comprehensive feedback of the CSI (i.e. without constraint on the number of RBs available for the feedback of the CSI). Under these conditions, the ideal authorization (scheduling) makes it possible to obtain the optimum solution to the problem (2).

In the absence of collision, the time average of the power consumed when the distributed method for allocating resources according to the invention is applied satisfies:

$$P^*_{id} \leq \lim_{T \to \infty} \sup \frac{1}{T} \sum_{t=1}^{T} \sum_{n=1}^{N} \mathbb{F}[P_n^{dist}] \leq P^*_{id} + \frac{C}{V} \quad (16)$$

with C and V finite values, the value of V being adjusted so as to obtain the average power being as close as possible to the optimum with a trade-off on the size of the queues.

Demonstration

The Lyapunov function $L_Q(t)$ is given by the relationship $$L_Q(t) := \frac{1}{2} \sum_{i=1}^{N} Q_i^2(t)$$

By following the same methodology as in [4], it is possible to prove that the "drift-plus-penalty" expression is bounded by the following upper bound:

$$\Delta(Q(t)) := \Delta(L(t)) + V \sum_{i=1}^{N} \mathbb{F}[(P_i(t) \mid Q(t))] \leq C + \sum_{i=1}^{N} Q_i(t)R_{th} - \mathbb{F}\left[\sum_{n=1}^{N} Q_i(t)R_i(\Gamma(t), H(t) \mid Q(t))\right] + V\mathbb{F}\left[\sum_{n=1}^{N} P_i(t)(\Gamma(t), H(t) \mid Q(t))\right] \quad (19)$$

with $\Gamma(t)$ the selection (strategy) which identifies which terminals will report their state of the D2D channel and jointly identifies the terminal to which a resource is allocated and C a constant such that:

$$\mathbb{F}\left[\sum_{i=1}^{N} \frac{R_{th}^2 + R_i^2(t)}{2} \mid Q(t)\right] \leq C$$

At each time interval (time slot), the method according to the invention satisfies the following equation:

$$\mathbb{F}\left[\sum_{i=1}^{N} [VP_i(\Gamma(t), H(t)) - Q_i(t)R_i(\Gamma(t), H(t))] \mid Q(t)\right] \leq \mathbb{F}\left[\sum_{i=1}^{N} [VP_i(\Gamma^*_{id}(t), H(t)) - Q_i(t)R_i(\Gamma^*_{id}(t), H(t))] \mid Q(t)\right] \quad (20)$$

where $\Gamma^*_{id}$ is the optimum ideal selection of the terminal to which a resource is allocated while assuming that the network has comprehensive feedback of the CSI.

Satisfying equation (20): at each time interval t (time slot), the method allows each terminal to report its CSI in the form of a resource index proportional to the value of its utility metric $v_n(t) = VP_n(t) - Q_n(t)R_n(t)$.

In the absence of collision, the authorized terminal is the one that has used the feedback resource with the lowest index, i.e. the one whose value of the utility metric is the smallest. Let $\Gamma(t)$ be the selection (strategy) which identifies the terminals successively authorized according to the method of the invention. If Γ(t) is compared to any selection Γ*(t) of CSI feedback and resource allocation including the optimum selection $\Gamma^*_{id}$ of equation (2) then it is found that:

$$\sum_{i=1}^{N}[VP_i(\Gamma(t), H(t)) - Q_i(t)R_i(\Gamma(t), H(t))] \mid$$

$$Q(t) \le \sum_{i=1}^{N}[VP_i(\Gamma^*(t), H(t)) - Q_i(t)R_i(\Gamma^*(t), H(t))] \mid Q(t)$$

Therefore, equation (20) is satisfied.

The optimum solution $\Gamma^*_{id}(t)$ satisfies the optimization problem (2) and thus guarantees the stability of the virtual queues. Assuming that the incoming throughput vector is within the stability region of the queue system, then:

$$\mathbb{E}\ [R_i(\Gamma^*_{id}(t))|Q(t)] = \mathbb{E}\ [R_i(\Gamma^*_{id}(t))] \ge R_{th} + \epsilon \text{ with } \epsilon > 0$$

The same methodology as in [33] gives:

$$\lim_{T \to \infty}\ \sup \frac{1}{T}\sum_{t=0}^{T-1}\sum_{i=1}^{N}\mathbb{E}[Q_i(t)] \le \frac{C+B}{\epsilon} \qquad (21)$$

with B a finite constant such that $$P^*_{id} = \lim_{T \to \infty} \frac{1}{T}\sum_{t=0}^{T-1}\sum_{i=1}^{N}\mathbb{E}[VP_i(\Gamma^*_{id}(t))] \le B$$

The preceding expression sets an upper limit on the total average backlog of the virtual queues. Thus, all of the queues of the system are highly stable. Consequently, whenever the incoming throughput vector is within the stability region, the proposed selection Γ(t) ensures the high stability of the queues of the network with a total average backlog of the queues which is inversely proportional to the distance between the throughput vector and the border of the stability region.

With the same methodology, it is the case that:

$$\frac{1}{T}\sum_{t=0}^{T-1}\sum_{i=1}^{N}\mathbb{E}[P_i(t)] \le \frac{C}{V} + \frac{\mathbb{E}[L_Q(0)]}{VT} + \frac{1}{T}\sum_{t=0}^{T-1}\sum_{i=1}^{N}\mathbb{E}[P_i(\Gamma^*_{id}(t))]$$

Hence the proof that proposition 3 is satisfied.

Probability of Collision

Demonstration of Relationship (17)

The following demonstration is limited to the case with a single bit rate M=1 (corresponding to the bit rate R and to the SNR γ).

Consider $K^{(2)}$ to be the number of resources available for the reporting of the indicators using a PUCCH format 1b control channel according to the LTE standard from the 3GPP. A collision occurs at the $k^{ième}$ level of the $K^{(2)}$ resources RE when the values of the utility metric of at least two D2D terminals are mapped onto the same element $a_m$ of $\mathbb{S}_v$. (If $\tilde{v}_i = \tilde{v}_j = a_m$ with $i \ne j$ then a collision occurs on the resource of index k=m).

For each element $a_j \in \mathbb{S}_v$ with $1 \le j \le K^{(2)}$, two events are defined in the following way:

$A_{i,j}$: the $i^{th}$ D2D link such that $\tilde{v}_i = a_j$ $B_{i,j}$: the $i^{th}$ D2D link such that $\tilde{v}_i \ge a_{min\{j+1, K^{(2)}\}}$ Considering a Rayleigh fading channel $h_i$ with an average of zero and unitary variance for the pair i of D2D terminals then the square of the norm, $|h_i|^2$, has a one-parameter exponential distribution. This therefore makes it possible to deduce therefrom the probability of the preceding two events:

For $1 \le j \le K^{(2)}$, the probability of $A_{i,j}$ is expressed in the form:

$$\mathbb{P}(A_{i,j}) = \mathbb{P}(\tilde{v}_i = a_j) = \mathbb{P}(v_i \in ]a_j, a_{j+1}]) =$$

$$\mathbb{P}\left(a_j < \frac{V_\gamma N_0}{|h_i|^2 L_i} - Q_i R \le a_{j+1}\right) =$$

$$2\left[\exp\left(-\frac{V_\gamma N_0}{(a_j + Q_i R)L_i}\right) - \exp\left(-\frac{V_\gamma N_0}{(a_{j+1} + Q_i R)L_i}\right)\right]$$

with $a_{K^{(2)}+1}$ equal to $+\infty$

For $1 \le j \le K^{(2)} - 1$, the probability of $B_{i,j}$ is expressed in the form:

$$\mathbb{P}(B_{i,j}) = \mathbb{P}(\tilde{v}_i \ge a_{j+1}) = \mathbb{P}(v_i > a_{j+1}) = 1 - 2\exp\left(-\frac{V_\gamma N_0}{(a_{j+1} + Q_i R)L_i}\right)$$

To simplify the preceding expressions, the following is posed:

$$c_{i,j} = -\frac{V_\gamma N_0}{(a_j + Q_i R)L_i}$$

Thus, $\mathbb{P}(A_{i,j})$ and $\mathbb{P}(B_{i,j})$ can be expressed in the form:

$\mathbb{P}(A_{i,j}) = 2[\exp(c_{i,j}) - \exp(c_{i,j+1})]$ $\mathbb{P}(B_{i,j}) = 1 - 2\exp(c_{i,j+1})$ Let $\overline{p}_c\{i, j\}$ be the probability that only the terminal i has its quantized value $\tilde{v}_i$ equal to $a_j \in \mathbb{S}_v$ for $1 \le j \le K^{(2)}$.

$$\overline{p}_c\{i, j\} = \mathbb{P}(A_{i,j}) \prod_{k=1 \ne i}^{N} \mathbb{P}(\overline{A}_{k,j}) =$$

$$2[\exp(c_{i,j-1}) - \exp(c_{i,j})] \times \prod_{k=1 \ne i}^{N}[1 - 2\exp(c_{k,j-1}) + 2\exp(c_{k,j})]$$

The probability of collision is therefore given by:

$$P_c = 1 - \sum_{i=1}^{N}\sum_{j=1}^{K^{(2)}} \overline{p}_c\{i, j\} \prod_{k<j}^{K^{(2)}}\left(1 - \sum_{k=1 \ne i}^{N}\overline{p}_c\{l, k\}\right)$$

This relationship corresponds to relationship (17).

Probability of Collision $P_c$ Bounded by A Value ε When (18)

Demonstration $\forall\{i, j\}$:

$\mathbb{P}(A_{i,j}) \ge \mathbb{P}(B_{i,K^{(2)}})$ $\mathbb{P}(\overline{A}_{i,j}) \ge \mathbb{P}(B_{i,K^{(2)}})$ Considering that for $1 \leq j \leq K^{(2)}-1$ it is the case that:

$$\mathbb{P}(A_{i,j}) = 2\left[\exp\left(-\frac{V_\gamma N_0}{(a_j + Q_i R)L_i}\right) - \exp\left(-\frac{V_\gamma N_0}{(a_{j+1} + Q_i R)L_i}\right)\right]$$

$$\mathbb{P}(A_{i,K^{(2)}}) = \mathbb{P}(B_{i,K^{(2)}-1}) = 1 - 2\exp\left(-\frac{V_\gamma N_0}{(a_{K^{(2)}} + Q_i R)L_i}\right)$$

then it is deduced therefrom that $\mathbb{P}(A_{i,j}) \geq \mathbb{P}(B_{i,K^{(2)}-1})$ and $\mathbb{P}(B_{i,j}) \geq \mathbb{P}(B_{i,K^{(2)}-1})$ for every $1 \leq i \leq N$ and every $1 \leq j \leq K^{(2)}$.

Considering the definition of $\mathbb{P}(A_{i,j})$ and of $\mathbb{P}(B_{i,j})$ then it is the case that:

$\mathbb{P}(A_{i,j}) = \mathbb{P}(B_{i,j-1}) - \mathbb{P}(B_{i,j}) \Rightarrow \mathbb{P}(\overline{A}_{i,j}) = 1 - \mathbb{P}(B_{i,j-1}) + \mathbb{P}(B_{i,j}) \Rightarrow \mathbb{P}(\overline{A}_{i,j}) \geq \mathbb{P}(B_{i,j}) \geq \mathbb{P}(B_{i,K^{(2)}-1})$ Considering the lower bounds of $\mathbb{P}(A_{i,j})$ and of $\mathbb{P}(\overline{A}_{i,j})$ it is possible to deduce therefrom a lower bound and an upper bound for $\overline{p}_c\{i,j\}$:

$$\overline{p}_c\{i,j\} \geq \Pi_{i=1}^N \mathbb{P}(B_{i,K^{(2)}})$$

$$\overline{p}_c\{i,j\} \leq \mathbb{P}(\overline{B}_{i+1\,modN,K^{(2)}})$$

And consequently it is possible to deduce therefrom an upper bound for the probability of collision $p_c$:

$$P_c = 1 - \sum_{i=1}^{N}\sum_{j=1}^{K^{(2)}} \overline{p}_c\{i,j\} \prod_{k<j}^{K^{(2)}}\left(1 - \sum_{l=1\neq i}^{N} \overline{p}_c\{l,k\}\right)$$

$$P_c \leq 1 - \prod_{m=1}^{N}(\mathbb{P}(B_{m,K^{(2)}-1})) \times \sum_{i=1}^{N}\sum_{j=1}^{K^{(2)}}\left[1 - \sum_{l=1\neq i}^{N} \mathbb{P}(\overline{B}_{l+1\,modN,K^{(2)}-1})\right]^j$$

$$P_c \leq 1 - NK^{(2)}$$

$$\prod_{m=1}^{N}\left[1 - 2\exp\left(-\frac{V_\gamma N_0}{(a_{K^{(2)}} + Q_m R)L_m}\right)\right] \times \left[1 - 2\sum_{i=1}^{N}\exp\left(-\frac{V_\gamma N_0}{(a_{K^{(2)}} + Q_i R)L_1}\right)\right]^{K^{(2)}}$$

For every $1 \leq i \leq N$ it is possible to verify that:

$$\exp\left(-\frac{V_\gamma N_0}{(a_{K^{(2)}} + Q_i R)L_1}\right) \leq \exp\left(-\frac{V_\gamma N_0}{(VP_{max} + R_{th}RT)L_{min}}\right)$$

where $L_{min}$ is the attenuation (path loss) for a D2D link with $d_{min}$ the distance between the terminals of the D2D pair, and T is the duration between two updates of the value of the Lyapunov constant V. Consequently $$P_c \leq 1 - NK^{(2)}\left[1 - 2N\exp\left(-\frac{V_\gamma N_0}{(VP_{max} + R_{th}RT)L_{min}}\right)\right]^{N+K^{(2)}}$$

By replacing the Lyapunov constant $V(\varepsilon')$ with (18) and $\varepsilon'$ with:

$$\varepsilon' := \frac{1}{2N}\left[1 - \left(\frac{1-\varepsilon}{NK^{(2)}}\right)^{\frac{1}{N+K^{(2)}}}\right]$$

then the probability of collision $P_c$ is bounded with $\varepsilon$.

TABLE 1

| Parameter | Value |
|---|---|
| cell radius $R_d$ in m | 500 |
| Bandwidth | 10 MHz equivalent to 50 RB |
| distribution of the terminals in the cell (UE drop) | uniform distribution with $d_{min} = 3$ m, $d_{max} = 350$ m, between D2D pair distance UE − BS ≥ 35 m |
| N | 50 |
| feedback parameter | $N_{RB} = 2$, $\Delta_{shift}^{PUCCH} = 1$, $N_{OC} = 3$, |
| Number of resource elements | $K^{(2)} = 72$ |
| $P_{max}$ in mW | 250 |
| attenuation (path loss) | The attenuation (path loss) model given by table A.2.1.2 (first column outdoor-to-outdoor) of document 3GPP TR 36.843 |
| simulation parameters | $T = 10^6$ ms, Number of iterations = 100 implementations |
| noise density in dBm/Hz | −174 |
| V | $10^{14}$ |

The invention claimed is:

1. A method comprising:
   allocating transmission resources, implemented by a cellular access network comprising a base station, to at least one transmitter terminal of a set Ω of pairs of terminals of index n that are candidates for direct communication, referred to as D2D terminals, a channel between two D2D terminals in direct communication being referred to as a D2D channel, wherein the allocating comprises:
   defining a lookup table of correspondence between different intervals of values of a utility metric and a list of indices ordered from a minimum index to a maximum index defining a ranking of resources available for reporting an indicator of a state of a D2D channel; and
   for a current transmission interval:
   calculating, by each transmitter terminal of a D2D pair of the set, a value of the utility metric $v_n(t)$ assessing an energy efficiency of the D2D communication of the pair,
   determining an index of a transmission resource to be used for reporting an indicator by each transmitter terminal of a D2D pair of the set by comparing its value of the utility metric $v_n(t)$ with the lookup table,
   reporting, by each transmitter terminal of a D2D pair of the set, an indicator via the resource of determined index,
   and determining, from said D2D transmitter terminals, a first terminal (n*) whose resource for reporting the indicator has the minimum order index, this first terminal being the D2D terminal authorized to transmit during the current transmission interval.

2. The method as claimed in claim 1, wherein the utility metric $v_n(t)$ is a function of transmitted power and of instantaneous throughput of communication of the D2D transmitter.

3. The method as claimed in claim 2, wherein the method further comprises broadcasting at least one parameter which minimizes probability of collision between the reports of indicators on the resources used.

4. The method as claimed in claim 1, wherein the method further comprises modifying the lookup table following a collision between reports of an indicator by a plurality of D2D transmitter terminals using the same resource index.

5. The method as claimed in claim 1, wherein the access network is of LTE type and the reported indicator is quantized on a maximum of two bits of a PUCCH format 1b control channel.

6. The method as claimed in claim 1, wherein the access network is of LTE type and the allocation of transmission resources from the base station to the first terminal uses a PDCCH downlink control channel of the access network.

7. A base station for allocating transmission resources to at least one transmitter terminal of a set Ω of pairs of terminals of index n that are candidates for direct communication, referred to as D2D terminals, a channel between two D2D terminals in direct communication being referred to as a D2D channel, wherein the base station comprises:
- a non-transitory computer-readable memory storing a lookup table of correspondence between different intervals of values of a utility metric and a list of indices ordered from a minimum index to a maximum index defining a ranking of resources available for reporting an indicator of the state of a D2D channel,
- a receiver configured to receive indicators reported via transmission resources, the respective index of which is determined by the transmitter terminal of a D2D pair by comparison between its value of the utility metric $v_n(t)$ and the lookup table,
- a processor configured to determine, from said D2D transmitter terminals, a first terminal (n*) whose resource for reporting the indicator has the minimum order index, and
- a transmitter configured to authorize, via a control channel, the first terminal to transmit during the transmission interval.

8. An access network comprising at least one base station as claimed in claim 7.

9. The access network as claimed in claim 8, wherein the access network is of LTE type and the reported indicator is quantized on a maximum of two bits of a PUCCH format 1b control channel.

10. The access network as claimed in claim 8, wherein the access network is of LTE type and the allocation of transmission resources from the base station to the first terminal uses a PDCCH downlink control channel of the access network.

11. The base station as claimed in claim 7, wherein the utility metric $v_n(t)$ is a function of transmitted power and of instantaneous throughput of communication of the D2D transmitter.

12. The base station as claimed in claim 7, wherein the transmitter is further configured for broadcasting at least one parameter which minimizes probability of collision between the reports of indicators on the resources used.

13. The base station as claimed in claim 7, wherein the processor is further configured for modifying the lookup table following a collision between reports of an indicator by a plurality of D2D transmitter terminals using the same resource index.

14. The base station as claimed in claim 7, wherein the access network is of LTE type and the reported indicator is quantized on a maximum of two bits of a PUCCH format 1b control channel.

15. The base station as claimed in claim 7, wherein the access network is of LTE type and the allocation of transmission resources from the base station to the first terminal uses a PDCCH downlink control channel of the access network.

16. A D2D terminal of a set Ω of pairs of terminals of index n in a coverage of a base station that are candidates for direct communication, referred to as D2D terminals, a channel between two D2D terminals in direct communication being referred as the D2D channel, wherein the D2D terminal comprises:
- a non-transitory computer-readable memory storing a lookup table of correspondence between different intervals of values of a utility metric and a list of indices ordered from a minimum index to a maximum index defining a ranking of resources available for reporting an indicator of a state of a D2D channel,
- a processing unit configured to calculate a value of the utility metric $v_n(t)$ assessing an energy efficiency of the D2D communication of the pair and for determining an index of a transmission resource to be used for reporting an indicator by comparing its value of the utility metric $v_n(t)$ with the lookup table,
- a transmitter configured to report, to the base station, an indicator via the resource of determined index, and
- a receiver configured to receive the indicators reported from other D2D terminals and/or for receiving authorization to transmit from the base station.

17. The D2D terminal as claimed in claim 16 wherein the processing unit is configured to update the lookup table in response to a collision during the reporting of the indicators.

18. The D2D terminal as claimed in claim 16, wherein the transmitter is configured to report said indicator using an access network of LTE type and the reported indicator is quantized on a maximum of two bits of a PUCCH format 1b control channel.

19. The D2D terminal as claimed in claim 16, wherein the receiver is configured to receive said authorization to transmit from the base station using an access network of LTE type and said received authorization to transmit uses a PDCCH downlink control channel of the access network.

* * * * *